US010897698B2

(12) United States Patent
Drevon et al.

(10) Patent No.: US 10,897,698 B2
(45) Date of Patent: Jan. 19, 2021

(54) SUPPORT OF RETRIEVAL AND/OR REPORTING AND/OR TRIGGERING THE REPORTING OF USER LOCATION INFORMATION IN A MOBILE NETWORK

(71) Applicant: Alcatel Lucent, Boulogne Billancourt (FR)

(72) Inventors: Nicolas Drevon, Nozay (FR); Laurent Thiebaut, Nozay (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/516,841

(22) PCT Filed: Oct. 2, 2015

(86) PCT No.: PCT/EP2015/072876
§ 371 (c)(1),
(2) Date: Apr. 4, 2017

(87) PCT Pub. No.: WO2016/055389
PCT Pub. Date: Apr. 14, 2016

(65) Prior Publication Data
US 2017/0295485 A1 Oct. 12, 2017

(30) Foreign Application Priority Data
Oct. 6, 2014 (EP) .................................. 14306568

(51) Int. Cl.
*H04L 12/28* (2006.01)
*H04W 8/08* (2009.01)
(Continued)

(52) U.S. Cl.
CPC ........... *H04W 8/08* (2013.01); *H04L 12/1407* (2013.01); *H04M 15/66* (2013.01); *H04W 64/006* (2013.01); *H04W 88/16* (2013.01)

(58) Field of Classification Search
CPC ... H04M 15/66; H04W 64/006; H04W 88/16; H04W 8/08
See application file for complete search history.

(56) References Cited

U.S. PATENT DOCUMENTS 9,413,666 B2* 8/2016 Vaidya .................... H04L 47/11
2009/0254494 A1* 10/2009 Li ...................... G06Q 30/0283
705/400
(Continued)

FOREIGN PATENT DOCUMENTS

EP 2 613 597 A1 7/2013

OTHER PUBLICATIONS

"3rd Generation Partnership Project; Technical Specification Group Services and System Aspects; Study on Core Network Overload (CNO) solutions (Release 12),"3GPP TR 23.843 V1.2.0, XP050764375, (Oct. 2013).

(Continued)

*Primary Examiner* — Minh Trang T Nguyen
(74) *Attorney, Agent, or Firm* — Fay Sharpe LLP

(57) ABSTRACT

An embodiment is a method for support of retrieval and/or reporting and/or triggering the reporting of user location information in a mobile network, wherein said user location information is retrieved and/or reported and/or the reporting of said user location information is triggered, at a granularity of an area referred to as administrative area defined as a set of mobile network related areas, mobile network related areas being defined at mobile network management level, and mobile network related areas being mapped to administrative areas.

16 Claims, 8 Drawing Sheets

(51) Int. Cl.
 *H04L 12/14* (2006.01)
 *H04M 15/00* (2006.01)
 *H04W 64/00* (2009.01)
 *H04W 88/16* (2009.01)

(56) References Cited

U.S. PATENT DOCUMENTS

| | | | | |
|---|---|---|---|---|
| 2010/0113035 | A1* | 5/2010 | Eskicioglu | H04W 36/0083 455/444 |
| 2010/0262359 | A1* | 10/2010 | Motoyama | G01C 21/32 701/532 |
| 2012/0064878 | A1* | 3/2012 | Castro Castro | H04L 12/14 455/418 |
| 2012/0246325 | A1* | 9/2012 | Pancorbo Marcos | H04L 63/102 709/227 |
| 2014/0293882 | A1* | 10/2014 | Choi | H04W 76/22 370/329 |
| 2015/0071125 | A1* | 3/2015 | Wang | H04L 12/1407 370/259 |
| 2015/0103647 | A1* | 4/2015 | Batz | H04W 28/0215 370/230 |
| 2015/0245241 | A1* | 8/2015 | Posz | H04W 28/0268 370/235 |
| 2015/0365789 | A1* | 12/2015 | Salot | H04W 4/02 455/456.1 |
| 2017/0366679 | A1* | 12/2017 | Mohamed | H04M 15/43 |

OTHER PUBLICATIONS

International Search Report for PCT/EP2015/072876 dated Dec. 4, 2015.
PCT Patent Application No. PCT/EP2015/072876, Written Opinion of the International Searching Authority, dated Dec. 4, 2015, 7 pages.
European Patent Application No. 14306568.8-1854, Extended European Search Report, dated Mar. 19, 2015, 8 pages.

* cited by examiner

| Octets | Bits | | | | | | | |
|---|---|---|---|---|---|---|---|---|
| | 0 | 7 | 6 | 5 | 4 | 3 | 2 | 1 |
| 1 | Type = 131 (decimal) | | | | | | | |
| 2 to 3 | Length = n | | | | | | | |
| 4 | Spare | | | | Instance | | | |
| 5 to (n+4) | Action | | | | | | | |

Figure 8.61-1: Change Reporting Action

Table 8.61-1: Action values

| Action | Value (Decimal) |
|---|---|
| Stop Reporting | 0 |
| Start Reporting CGI/SAI | 1 |
| Start Reporting RAI | 2 |
| Start Reporting TAI | 3 |
| Start Reporting ECGI | 4 |
| Start Reporting CGI/SAI and RAI | 5 |
| Start Reporting TAI and ECGI | 6 |
| Start reporting admin-level-1 | 7 |
| Start reporting admin-level-2 | 8 |
| <spare> | 9-255 |

Fig. 9

SUPPORT OF RETRIEVAL AND/OR REPORTING AND/OR TRIGGERING THE REPORTING OF USER LOCATION INFORMATION IN A MOBILE NETWORK

The present invention generally relates to mobile communication networks and systems.

Detailed descriptions of mobile communication networks and systems can be found in the literature, such as in particular in Technical Specifications published by standardization bodies such as for example 3GPP ($3^{rd}$ Generation Partnership Project).

In general, in a mobile system, a User Equipment (UE) has access to various services or applications via a mobile network (also called Public Land Mobile Network PLMN) providing communication services. A mobile network can in particular be an IP-Connectivity Access Network (IP-CAN) providing communication services including providing IP connectivity. An example of mobile network such as IP-CAN is EPS (Evolved Packet System) network, specified in particular in 3GPP TS 23.401 and 3GPP TS 23.402.

In general, a mobile network comprises a Core Network (CN) accessed by a Radio Access Network (RAN). For example, an EPS network comprises EPC (Evolved Packet Core) that can be accessed by different Radio Access Networks (including E-UTRAN, UTRAN/GERAN). In general, a mobile network comprises various mobile network entities including Core Network entities and Radio Access Network entities. EPC entities include MME (Mobility Management Entity), SGW (Serving Gateway), SGSN (Serving GPRS Support Node), PDN GW (PDN Gateway). In E-UTRAN, entities include eNB (eNodeB). Interfaces within EPS network include in particular: S1 interface between E-UTRAN and MME, S11 interface between MME and SGW, S4 interface between SGSN and SGW, S5/S8 interface between SGW and PGW. EPS is specified in particular in 3GPP TS 23.401 for E-UTRAN access case and in 3GPP TS 23.060 for GERAN/UTRAN access case. Examples of EPS network architectures are recalled in FIG. 1 taken from 3GPP TS 23.401 (for GTP-based S5 interface) and FIG. 2 taken from 3GPP TS 23.402 (for PMIP-based S5 interface).

In general, a mobile network also comprises a policy and/or charging controller. For example, in EPS network, Policy and Charging Control (PCC) functionality is specified in particular in 3GPP TS 23.203. PCC functions include in particular: PCRF (Policy and Charging Rules Function), PCEF (Policy and Charging Enforcement Function), Online Charging System (OCS), SPR (Subscriber Profile Repository). Interfaces within PCC architecture include in particular: Gx interface between PCRF and PCEF (for GTP-based S5/S8 interface), Gxc interface between PCRF and SGW (for PMIP-based S5/S8 interface). An example of PCC architecture is recalled in FIG. 3 taken from 3GPP TS 23.203. FIG. 4, also taken from 3GPP TS 23.203, illustrates PCC architecture applied to an EPS IP-CAN (GTP-based), where PCEF is located in PDN GW.

In such networks and systems, it is important (e.g. for charging, . . . etc.) to provide for retrieval/reporting/triggering a reporting of, user location information.

For example, in EPS, location change reporting procedures have been specified, including procedures (specified in particular in 3GPP TS 29.212 and 3GPP TS 29.274) whereby PCRF/OCS triggers user location change reporting from PDN GW, the user location change reporting trigger is then propagated from PDN GW to serving Mobility Management Entity MME or SGSN (serving the User Equipment UE), and a user location change (with User Location Information ULI) is reported by MME (or SGSN), then propagated from MME (or SGSN) to PDN GW and then to PCRF (or OCS).

An example of signaling flow for triggering a reporting of user location information/user location change is recalled in FIG. 5, taken from 3GPP TS 29.213. User location change reporting trigger is performed in particular at IP-CAN session establishment. Steps performed at IP-CAN session establishment can be illustrated in a simplified way by steps 2, 3, 5, 6, 8, 12, 14 of FIG. 5 (where the entity BBERF would be replaced by Serving Gateway SGW).

There may be similar concepts in systems other than EPS (taken above as an example).

As recognized by the inventors and as will be described with more details later, there is a need to enhance such retrieval/reporting/triggering the reporting of user location information. In particular there is a need to enable retrieval/reporting/triggering the reporting of user location information, at a granularity level other than the (currently specified) granularities at a level of an area that will be called mobile network related area (or PLMN related area), used to manage the mobile network.

For example, mobile network related areas used to manage an EPS network include:

Cells (used in GERAN and E-UTRAN cases)
ENBs (used in E-UTRAN case)
Service Areas SA (used in UTRAN case)
Location Areas (LA), Routing Areas (RA), Tracking Areas (TA).

Areas such as LA/RA/TA in EPS network will also be called mobility management areas.

Also, it is important that the signaling load generated by such procedures in such networks is not increased.

Embodiments of the present invention in particular address such needs.

These and other objects are achieved, in one aspect, by a method for support of retrieval and/or reporting and/or triggering the reporting of user location information in a mobile network, wherein said user location information is retrieved and/or reported and/or the reporting of said user location information is triggered, at a granularity of an area referred to as administrative area defined as a set of mobile network related areas, mobile network related areas being defined at mobile network management level, and mobile network related areas being mapped to administrative areas.

These and other objects are achieved, in another aspect, by a method for enhancing the reporting, respectively/triggering the reporting of, user location change in a mobile network, said method comprising:

reporting, respectively triggering the reporting of, user location change of administrative area at at least one administrative level, wherein an administrative level is associated in said mobile network with a mapping of administrative areas onto mobile network related areas defined for mobile network management.

These and other objects are achieved, in other aspects, by entities for performing related step(s) of such method(s), said entities including, in particular (though not exclusively): RAN entity such as eNB in EPS network, mobile core network entity capable of serving a User Equipment such as Mobility Management Entity MME or Serving GPRS Support Node SGSN or Trusted WLAN Access Gateway TWAG in EPS network, policy and/or charging controller such as Policy and Charging Rules Function PCRF or Online Charging System OCS in EPS network, mobile network entity such as Packet Data Network Gateway PDN GW in EPS network, Operation And Maintenance OAM entity.

Some embodiments of apparatus and/or methods in accordance with embodiments of the present invention are now described, by way of example only, and with reference to the accompanying drawings, in which.

Figure 1:
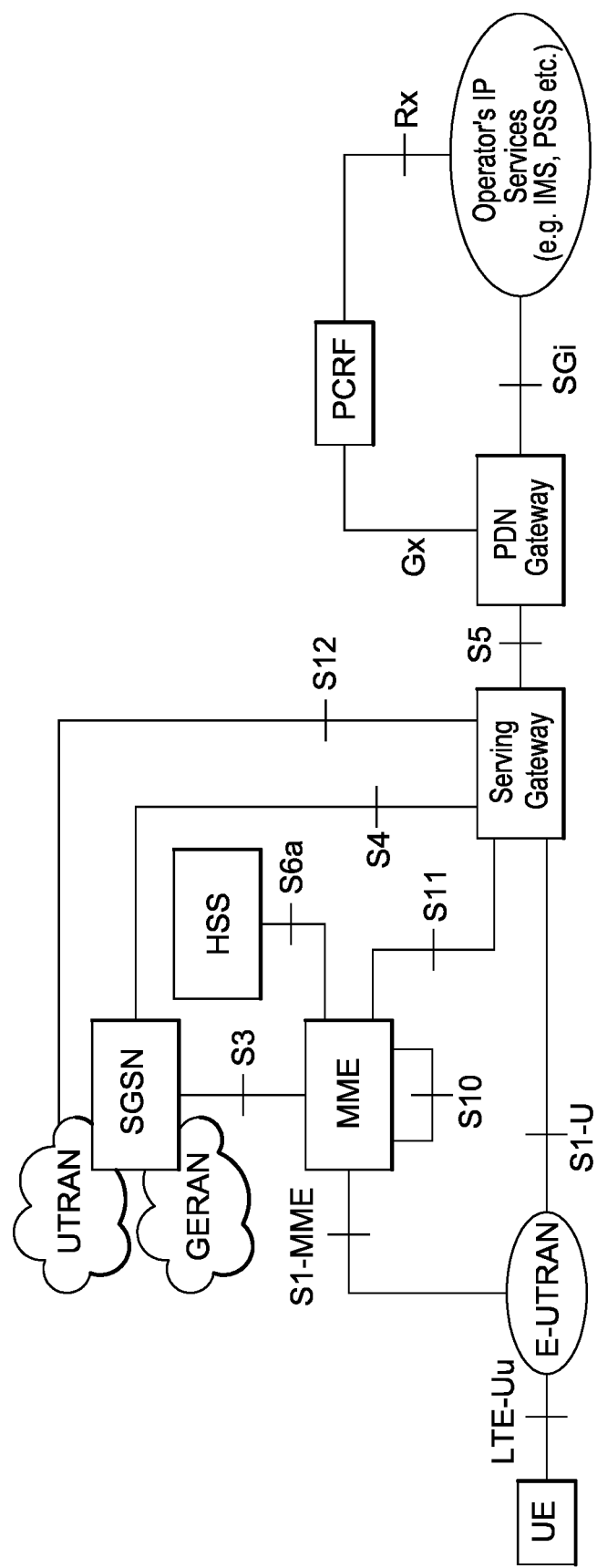
FIGS. 1 and 2 are intended to recall examples of EPS architecture.
Figure 2:
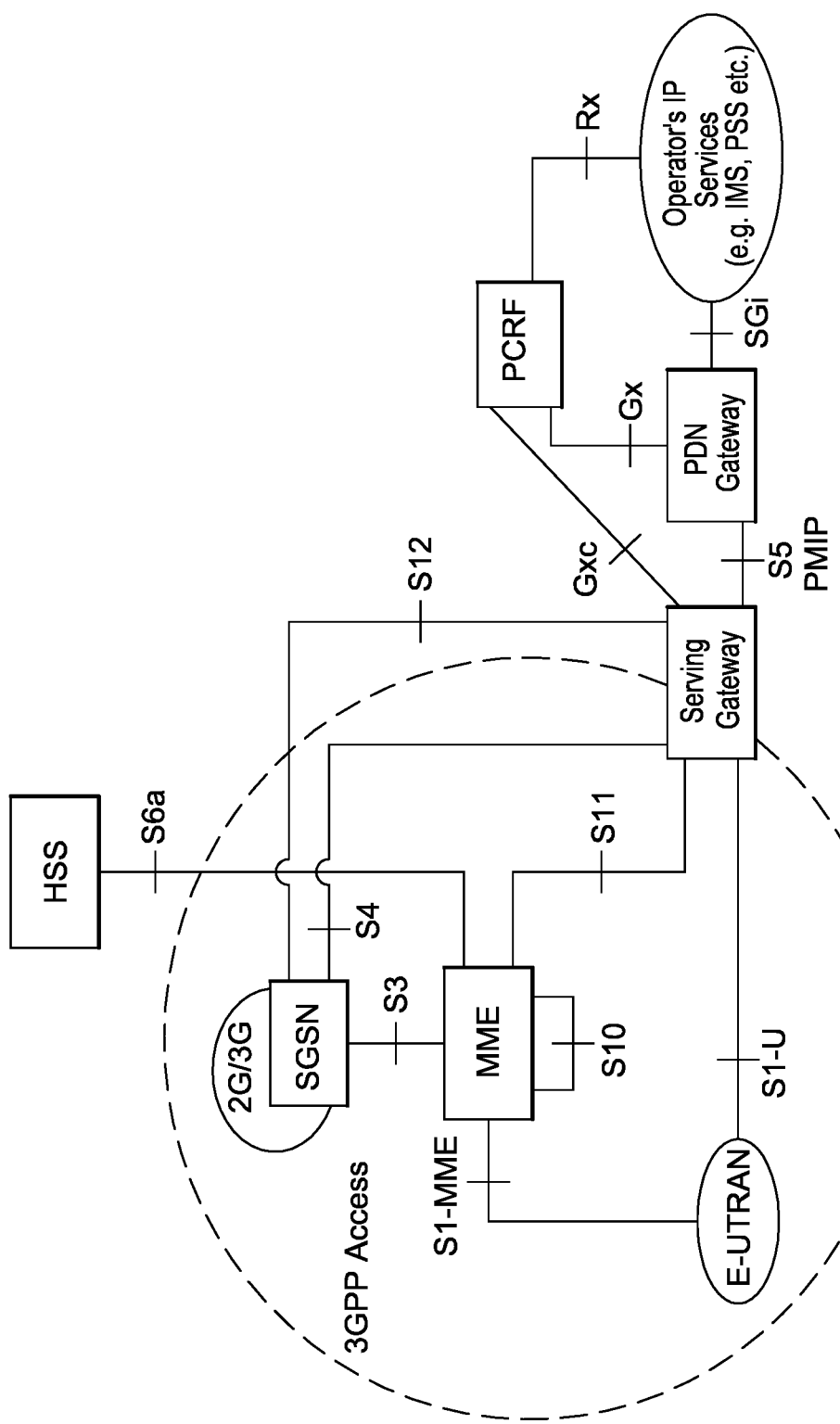
Figure 3:
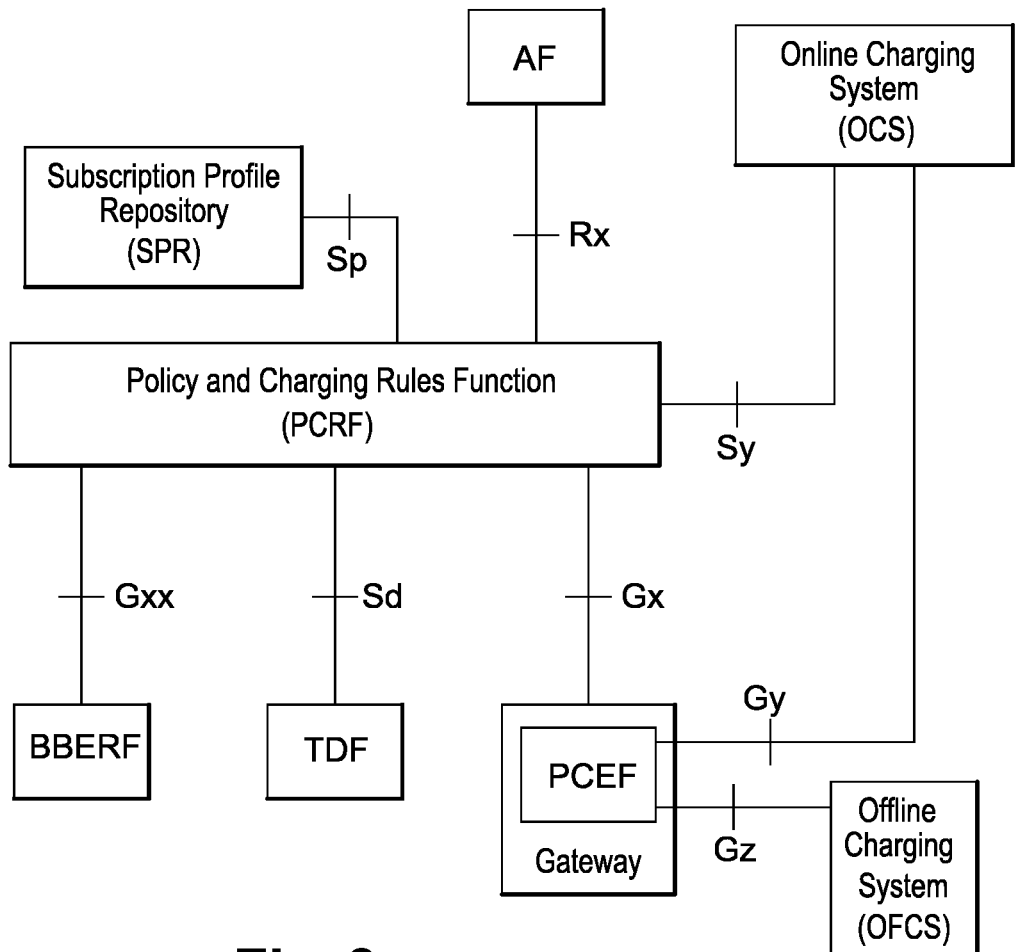
FIGS. 3 and 4 are intended to recall examples of PCC architecture.
Figure 4:
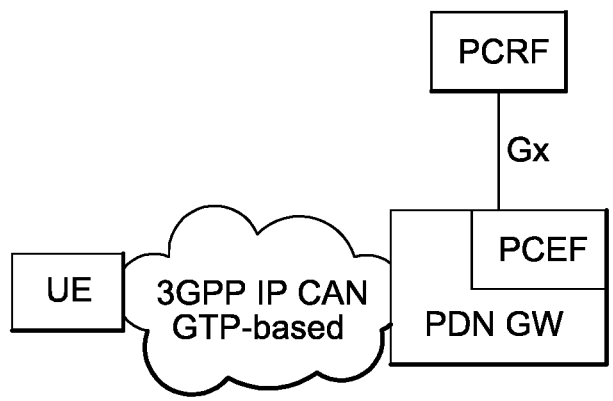
Figure 5:
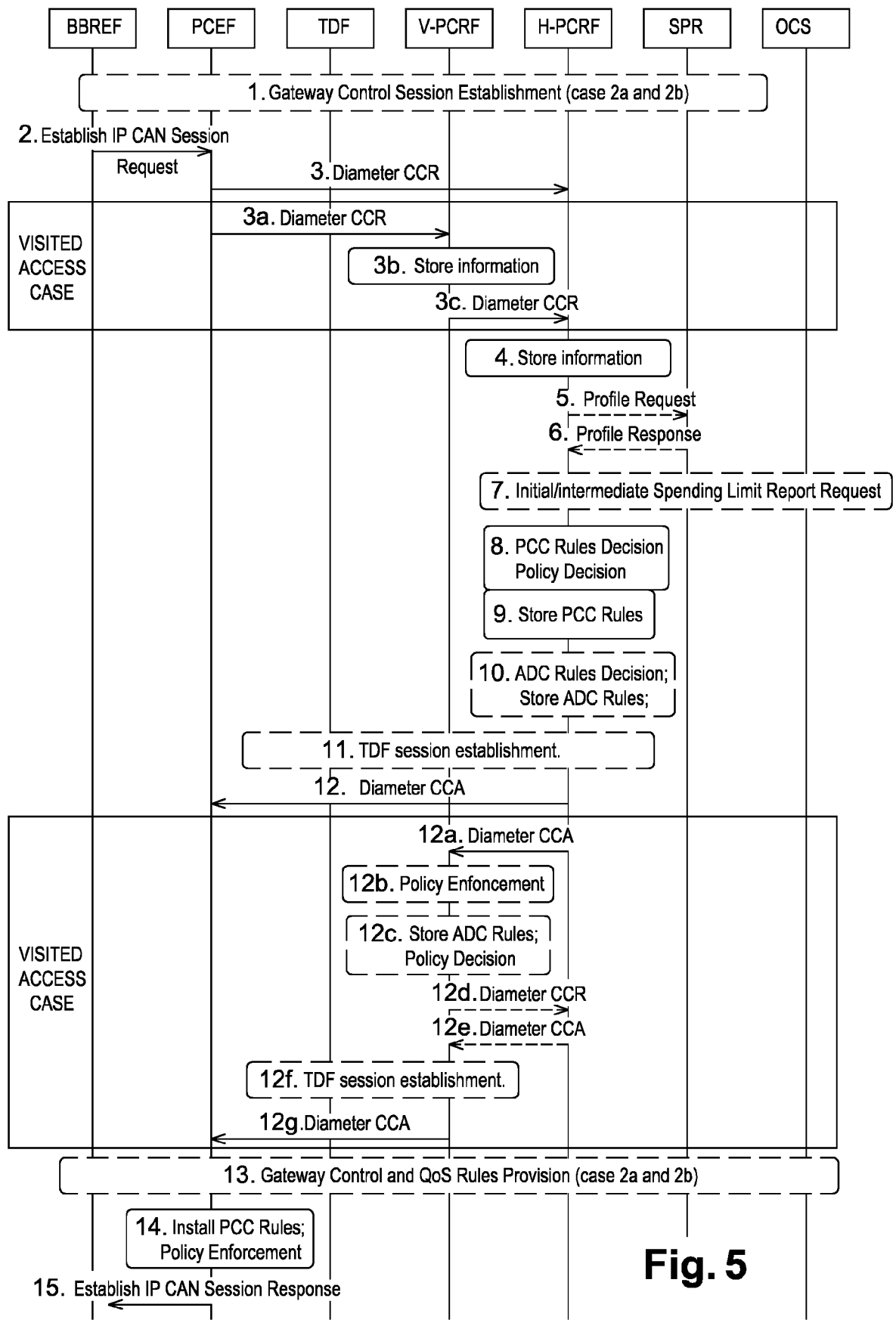
Figure 6:
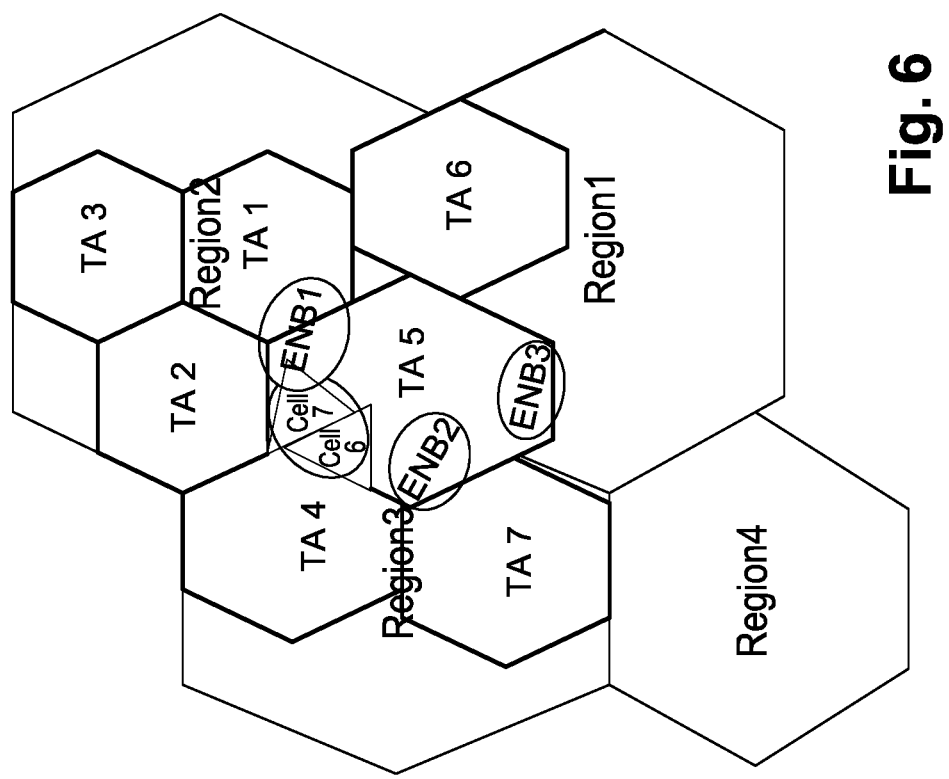
Figure 7:
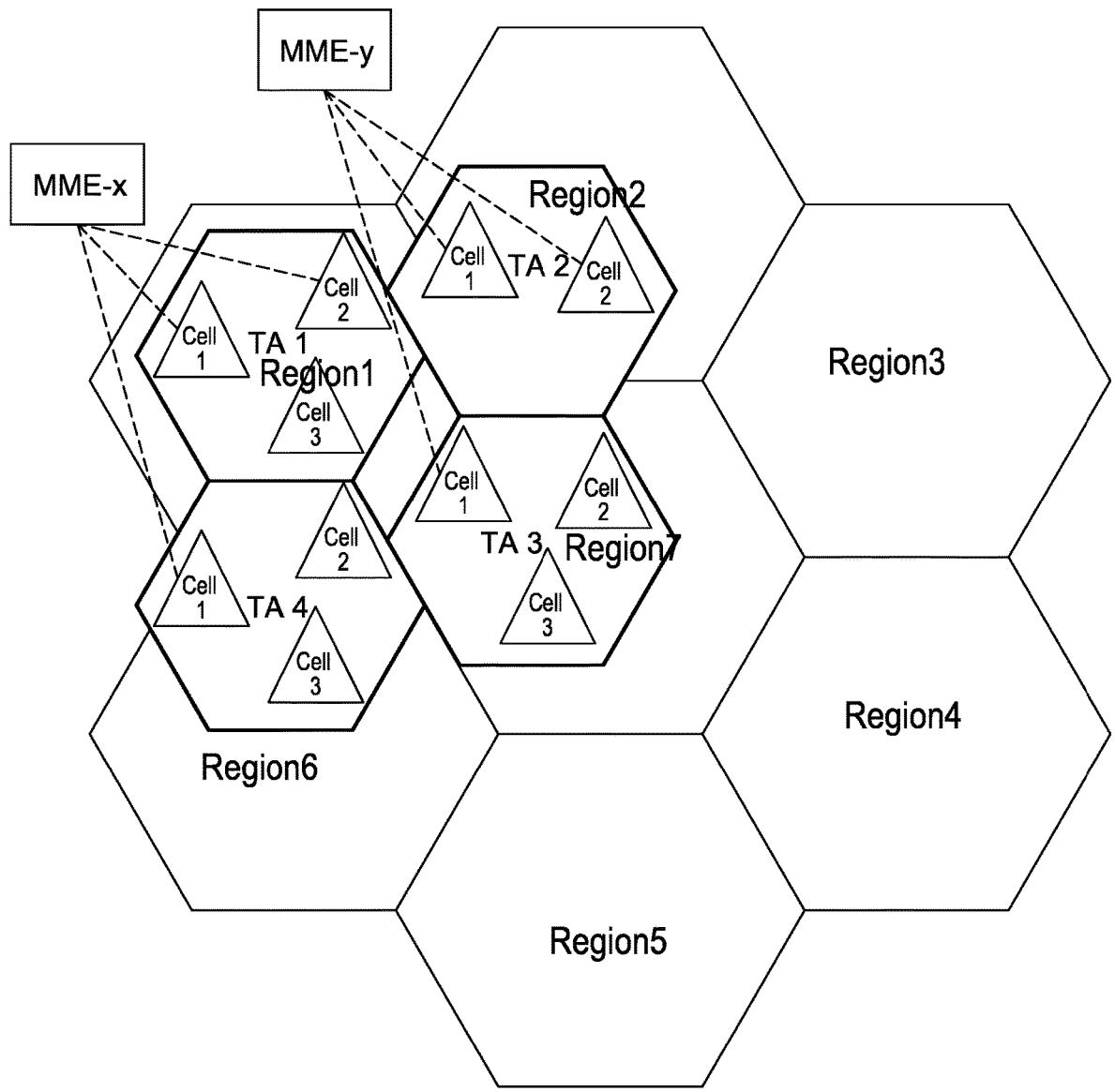
Figure 8:
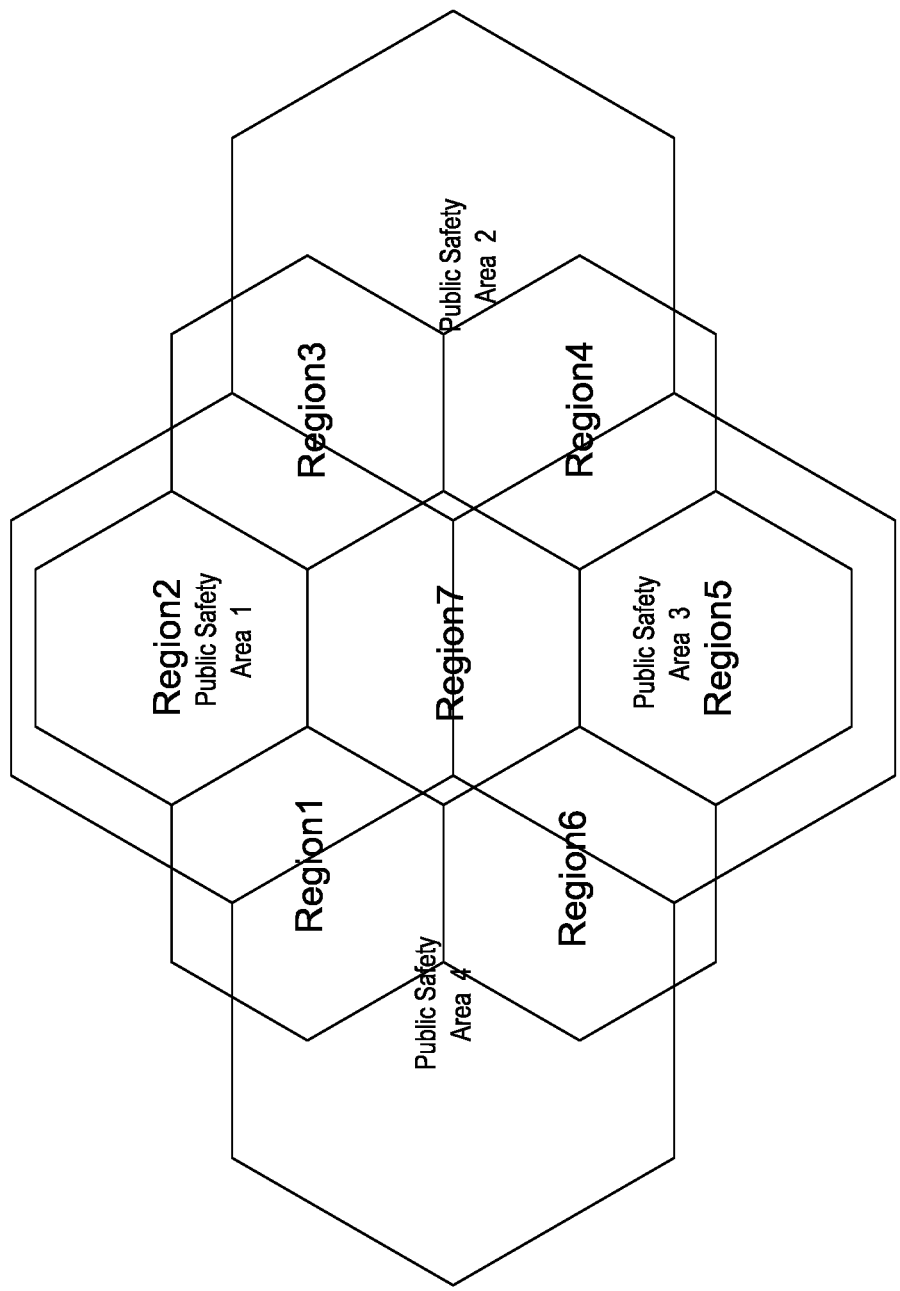

FIG. 5 is intended to recall an example of signaling flow for triggering a reporting of user location information/user location change, FIG. 6 is intended to illustrate in a simplified way a first example of mapping of mobile network related areas onto administrative areas, according to embodiments of the present invention, FIG. 7 is intended to illustrate in a simplified way a second example of mapping of mobile network related areas onto administrative areas, according to embodiments of the present invention, FIG. 8 is an example intended to illustrate several levels of administrative areas, according to embodiments of the present invention, FIG. 9 is intended to illustrate a signaling mechanism for start/stop of ULI reporting at administrative level, according to embodiments of the present invention.

By way of example, the description below will be made for an EPS network. It should however be understood that the present invention is not limited to an EPS network.

Current 3GPP networks allow the PGW (PDN GW as defined in 3GPP TS 23.401) or GGSN (as defined in 3GPP TS 23.060), the PCRF (Policy and Charging Rule Function as defined in 3GPP TS 23.203) or the OCS (On Line Charging System as defined in 3GPP TS 32.240) to request ULI (User Location Information) reporting from the Serving Node of the UE (MME/SGSN) to the PGW (that reports it to the PCRF/OCS).

The ULI as currently defined in 3GPP corresponds to UE Location Information associated with mobile network related areas (or PLMN related areas) used to manage the PLMN.

The PCRF/OCS/PGW may define the granularity (Cell, eNB, SA, TA, LA, RA) at which the ULI is to be reported. The reporting is done each time the UE changes of Cell, eNB, SA, TA, LA, RA (depending on the requested granularity for ULI reporting). This feature is defined in 3GPP TS 23.203.

Anyhow there may be (e.g. for charging or any other administrative reasons) the need to track where the UE is but not at the level of "mobility management" related areas but at the level of areas that will be called administrative areas, not used to manage the PLMN but that may e.g. be defined in the country (Province in China, State in the US, Lander in Germany, department in France, county in UK, . . . ).

In current 3GPP specifications, it is only possible for the MSC/SGSN/MME to notify the PCRF and/or the OCS by reporting UE Location Information (ULI) at changes of cells, eNBs, Location Areas, Routing Areas, Service Areas and/or Tracking Areas, i.e. it is not possible to notify the PCRF and/or the OCS for any other area level.

A possible solution would be for PCRF or OCS to configure an administrative area as a list of e.g. LAs/RAs/SAs/TAs and/or eNBs and/or cells and to trigger ULI reporting at appropriate "mobility management" level(s), and then upon receiving an event reporting a change of LA/TA to check whether this corresponds to an actual change of an administrative area. But this would result in a huge signaling load although the requirement is just to notify (and possibly to also report the ULI) when the UE changes administrative area: when LA/RA/TA reporting is used only for that purpose, this implies useless signaling in the network when LA/RA/TA are within the same administrative area (especially for TA that are meant to be smaller than LA/RA in order to associate UE(s) not subject to TA reporting with TA lists dynamically centered around the current TA of the UE). Moreover, an administrative area may correspond to a mix of TAs, eNBs and cells, which would imply changing granularity reporting depending on the UE location.

There is a need for another approach to provide for retrieval/reporting/triggering the reporting of user location information at the granularity of an administrative area, in particular avoiding such drawbacks. Embodiments of the present invention address these and other needs.

One or more of following aspects and/or embodiments can be provided:

Defining a new granularity for ULI reporting: the "Administrative Area", defined as a mixed set of mobile network related areas e.g. cells, eNBs, Service Areas, Location Areas, Routing Areas, Tracking Areas;

Providing a mechanism for triggering the report of a change of administrative area from the PCRF or OCS for a given UE, whereby the PCRF or the OCS can trigger the reporting of a change of administrative area using an "administrative area level identifier" without the need to know the mapping between an administrative area and a set of mobile network related areas e.g. cells, eNBs, SAs, LAs, RAs, TAs.

Providing the possibility to trigger the reporting of several levels of administrative areas for a given UE.

Whereby

What the administrative areas correspond to is a matter of local configuration between the PCRF/OCS and the MMEs and/or the SGSNs and or TWAG Each administrative area is associated with an "administrative area level".

Administrative areas of the same "administrative area level" don't overlap each others.

An example of administrative areas (at a given administrative level) and their relationship with mobile network related areas is illustrated in a simplified way in FIG. 6.

In the example illustrated in FIG. 6, administrative areas (identified by an identifier such as "admin1", "admin2", "admin3") are defined as a set of PLMN related areas including TAs and (in case of TA split between multiple administrative areas, which is for example the case of TA5 in FIG. 6, which is split between administrative areas admin2 and admin3) eNBs and/or cells.

One or more of following aspects and/or embodiments can be provided:

Per administrative level, MME/SGSN are configured with a mapping table from PLMN related areas TAs/LAs/RAs to administrative areas (e.g. county in UK, state in US) or to an indication that the PLMN related area is split between multiple administrative areas. In the example of FIG. 6, such mapping table in MME is noted "MME Table: admin area per TAI", and such indication is noted "Multiple". If the PLMN related area TA is split between multiple administrative areas, for any cell within this PLMN related area the MME needs to consider configuration information at cell level (actually retrieved from the RAN itself).

In addition, several independent administrative levels can be defined in the same PLMN, for example French Regions, Public Safety Areas, Military Responsibility Areas, etc. And so, it is possible for PCRF/OCS to trigger location reporting at French Region level for a UE, but at Public Safety Area level for another UE. It would also be possible for PCRF/OCS to trigger the location report at both French Regions and Public Safety Area level for a third UE. The constraint is that the French Regions don't overlap each other, the Public Safety Areas don't overlap each other, the Military Responsibility Areas don't overlap each other.

The ENB are configured with the administrative areas of the cells they support. Such configuration is illustrated in FIG. 6 by a table noted "MME Table: admin area per ENB and cell". The eNB indicate the mapping (from Cell-Id to administrative area) to the MME via S1 related signaling (e.g. in S1 SETUP REQUEST or ENB Configuration). S1 related signaling is specified in particular in 3GPP TS 36.413, which would then include such signaling according to such aspects and/or embodiments of the invention.

An alternative is that the MME/SGSN is configured with administrative areas at the cell level.

When the MME detects that a UE is in an eNB that includes one of the cells it controls (the MME/SGSN can derive the eNB identity from the cell-ID as it is the MSB bytes of the cell-ID), it can request the eNB to inform the MME each time the eNB detects a change of cell. With this alternative, there is no need to configure the eNBs with administrative areas.

Other entities in the PLMN do not need to be bothered with the relationship between administrative areas and PLMN related areas (e. g. LA, RA, TA, Cell Id, ENB)

Another example of administrative areas (at a given administrative level) and their relationship with mobile network related areas is illustrated in a simplified way in FIG. 7. In FIG. 7 an administrative area is called "Region".

In the example illustrated in FIG. 7:
Region 1 is composed of
TA-1
One cell of TA-2
One cell of TA-3
Two cells of TA-4
Regions are configured:
Either fully in the MME/SGSN nodes for the cells they control:
  MME-x, which controls TA-1 and TA-4 is configured with Region 1=TA1 and cells 1 and 2 of TA-4
  MME-y, which controls TA-2 and TA-3 is configured with Region 1=cell1 of TA-2 and cell 1 of TA-3
Or in the RAN (e.g. eNB), and the RAN indicates to the MME which cells are mapped to which administrative area
Or in the MME/SGSN for the TAs that are completely included in the administrative area and in the RAN for other cells of the administrative area FIG. 8 shows an example with two administrative area levels, where administrative areas at one level are called "Region" and administrative areas at another level are called "Public Safety Area".

One or more of following aspects and/or embodiments may be provided: Current signaling mechanisms to start/stop ULI reporting and to report ULI are specified in particular in 3GPP TS 29.212 and 3GPP TS 29.274, which would then be modified to introduce signaling (messages) to start/stop ULI reporting and to report ULI at administrative level.

Embodiments related to start/stop ULI reporting at administrative level may include:
  Over Gx (from PCRF to PGW), the Event-Trigger AVP specified in 3GPP TS 29.212 § 5.3.7 is modified to add new event requests: one per administrative level.
  Over the signaling interfaces (from PGW to MME/SGSN) the "Change Reporting Action" as specified in 3GPP TS 29.274 § 8.61 is modified to introduce Action "Start reporting" at administrative level, such as Action "Start reporting admin-level-1" and "Start reporting admin-level-2", as illustrated in FIG. 9 corresponding to FIG. 8.61-1 of 3GPP TS 29.274 (representing the coding of the Change Action Reporting Action) and to "Table 8.61-1: Action Values" of 3GPP TS 29.274. This corresponds to starting/stopping ULI reporting at administrative level from PGW to the Serving Node of the UE (e.g. MME/SGSN/TWAG).

Embodiments related to ULI report at administrative level may include: For the reporting at an administrative level, the User Location Information (ULI) as specified in particular in 3GPP TS 29.274 § 8.21, and the Event-Report-Indication AVP as specified in particular in 3GPP TS 29.212 (Gx between PCRF and PGW) are modified to add the possibility to report at an administrative area level 1 or at an administrative area level 2.

These administrative area level 1 or an administrative area level 2 are defined each as a number 0 . . . 65535 in order to keep the information short and the same for all countries (avoiding complex per country data structures). The mapping of these number to an actual administrative structure in the country (Province in China, State in the UE, Lander in Germany, department in France, county in UK, . . . ) is left for local configuration in the PCRF and in the OCS and in the Serving Node (MME/SGSN/TWAG).

In some embodiments, one or more of following steps may be provided:
  Steps 0 and 1 (performed "once") related to the operation of the network,
  step 2 related to triggering location change reporting at administrative level for a user,
  step 3 related to detecting if a location change has occurred for the User Equipment UE at administrative level, (then reporting this detected location change).

Embodiments for step 0 may include:
The operator configures
  a. the Serving Nodes (MME/SGSN) with the mapping between mobility related areas (TA, RA, LA, eNB, Service Area) and administrative areas each being identified with an administrative area identity
  b. the ENB with the administrative areas of the cells they serve. The ENB provides this information in all MME of the MME Pool area (i.e. area served by one or more MMEs in parallel) via S1 signaling.

Alternatively, the MME/SGSN may be configured with administrative areas at a mix of TA, RA, LA, SA, eNB and cell levels (no configuration at eNB level).

Embodiments for step 1 may include:
  The Operator configures the SPR with the administrative area identity and related rules (that could depend on the time of the day/day of the week/etc . . . ) for some users and APN (the administrative area may only apply to certain subscriptions).

Embodiments for step 2 may include:
  Triggering location reporting at administrative area for a UE, which may be performed in the way recalled in FIG. 5, except that the Profile in the SPR contains the administrative area identity (and level) and related rules, and that the Gx signaling issued by the PCRF contains an event trigger related to the triggering of location change report at administrative area(s) level (together with the value of this/these administrative level(s)). Upon reception of a request of location change report at administrative level, the Serving Node of the UE (e.g. MME/SGSN) reports the initial value of the administrative area(s). To do so the Serving Node of the UE (e.g. MME or SGSN) uses the configuration information described with the Embodiments for step 3

Embodiments for step 3 may include:

A change of administrative area can be detected in case of TA change from one TA mapped to one administrative area, to another TA mapped to another administrative area that is not split between multiple administrative areas. A serving MME can make such detection, based on configuration information (such as MME Table of FIG. 6) and based e.g. on signaling associated with TA update procedure. For example, in FIG. 6, a change of administrative area from admin 2 to admin 3 is detected in case of change from TA2 to TA4.

In case of TA change, from one TA mapped to one administrative area, to another TA mapped to another administrative area that is split between multiple administrative areas:

A change of administrative area can be detected in case of eNB change, from one eNB mapped to one administrative area, to another eNB mapped to another administrative area. A serving MME can make such detection, based on configuration information such as MME Table of FIG. 6, and based e.g. on signaling associated with handover or mobility procedures. For example, in FIG. 6, a change of administrative area from admin 2 to admin 3 is detected in case of change from eNB1 to eNB2.

A change of administrative area can be detected in case of cell change within an eNB, when the UE is in RRC connected mode, from one cell mapped to one administrative area, to another cell mapped to another administrative area. To enable such detection, a serving MME has to trigger a location reporting procedure towards eNBs it supports, and that support cells mapped to multiple administrative areas. Such location reporting procedure is specified in particular in 3GPP TS 36.413. The serving MME can then make such detection, based on configuration information such as the MME Table of FIG. 6, and on such cell change reporting from eNB. Such location reporting procedure then only needs to be used in case cells within a mobility management area (TA) are split between multiple administrative areas. For example, in FIG. 6, a change of administrative area from admin 2 to admin 3 is detected in case of change from Cell7 to Cell6.

Note: the notion of administrative area can further be extended to non 3GPP coverage (e.g. WiFi), in which case admin area reporting allows reporting that spans over both 3GPP and Non 3GPP coverage in step 2 the request for location change report at administrative level (together with the value of this administrative level) is sent by the PGW (PCEF) to the Serving Node of the UE over WiFi (such as the TWAG, Trusted WLAN Access Gateway defined in 3GPP TS 23.402). Upon reception of a request of location change report at administrative level, the TWAG reports the initial value of the administrative area(s) for the UE In Step3, upon detection of the mobility of the UE between 2 WiFi Access Points AP, the TWAG checks whether the 2 AP belong to the same administrative areas.

To know the administrative areas associated with the AP it is serving, the TWAG may leverage information sent by the AP in Radius signaling associated with the UE, such as GEOCONF_CIVIC coding of location information as defined in RFC 5580 and 4776.

In one aspect, there is provided a method for support of retrieval and/or reporting and/or triggering the reporting of user location information in a mobile network.

Various embodiments are provided, which may be taken alone or in combination, according to various combinations, including following embodiments.

In an embodiment, said user location information is retrieved and/or reported and/or the reporting of said user location information is triggered, at a granularity of an area referred to as administrative area defined as a set of mobile network related areas, mobile network related areas being defined at mobile network management level, and mobile network related areas being mapped to administrative areas.

In an embodiment, an administrative area is defined as a set of mobile network related areas including mobility management areas such as Tracking Area TA or Routing Area RA or Location Area LA.

In an embodiment, wherein an administrative area is defined as a set of mobile network related areas including mobility management areas such as Tracking Area TA or Routing Area RA, and further including, in case of a mobility management area split between multiple administrative areas, areas served by one or more cells such as eNodeB eNB or Service Area SA, and/or individual cells.

In an embodiment, said method comprises:

a policy and/or charging controller, such as Policy and Charging Rules Function PCRF or Online Charging System OCS, triggering towards a mobile network entity such as Packet Data Network Gateway PDN GW a reporting of user change of administrative area.

In an embodiment, said method comprises:

a Packet Data Network Gateway PDN GW sending towards a mobile core network entity capable of serving a User Equipment UE, such as Mobility Management Entity MME or Serving GPRS Support Node SGSN or Trusted WLAN Access Gateway TWAG, a request to start the reporting of a user change of administrative area.

In an embodiment, said method comprises:

an administrative area level is identified by an administrative area level identifier in a policy and/or charging controller such as PCRF or OCS capable of triggering a reporting of User Equipment UE change of administrative area at the said administrative area level.

In an embodiment, said method comprises:

a policy and/or charging controller such as PCRF or OCS, triggering a reporting of User Equipment UE change of administrative area at at least one of several administrative area levels, In an embodiment, said method comprises:

a policy and/or charging controller such as PCRF or OCS requesting the reporting of User Equipment UE change of administrative area at administrative area level via signaling to a mobile network entity such as Packet Data Network Gateway PDN GW.

In an embodiment, said method comprises:

a policy and/or charging controller such as PCRF or OCS requesting a reporting of User Equipment UE change of administrative area at administrative area level via including the administrative area level identity(ies) in the signaling to a a mobile network entity such as Packet Data Network Gateway PDN GW.

In an embodiment, said method comprises:

a mobile network entity such as Packet Data Network Gateway PDN GW requesting the reporting of User Equipment UE change of administrative area at administrative area level via including the administrative area level identity(ies) in the signaling to a mobile core network entity capable of serving a User Equipment UE, such as Mobility Management Entity MME or Serving GPRS Support Node SGSN or Trusted WLAN Access Gateway TWAG.

In an embodiment, said method comprises:

an Operation And Maintenance OAM entity configuring a mobile core network entity capable of serving a User Equipment, such as Mobility Management Entity MME, with a mapping of mobile network areas including mobility management areas such as Tracking Area TA, to administrative areas, each being associated with an administrative area level identifier, or to an indication that a mobility management area is split between multiple administrative areas.

In an embodiment, said method comprises:

an Operation And Maintenance OAM entity configuring a mobile core network entity capable of serving a User Equipment, such as Mobility Management Entity MME, with a mapping of mobile network areas including areas served by one or more cells such as eNodeB eNB, to administrative areas, each being associated with an administrative area level identifier.

In an embodiment, said method comprises:

an Operation And Maintenance OAM entity configuring a RAN entity such as eNodeB eNB, with the administrative areas to which cells supported by the RAN entity are mapped.

In an embodiment, said method comprises:

a RAN entity such as eNodeB eNB, indicating configuration information including a mapping of cells supported by the RAN entity onto administrative areas of different levels, to at least one mobile core network entity capable of serving a User Equipment such as Mobility Management Entity MME, such as via S1 related signaling, such as via S1 Setup Request or ENB Configuration message.

In an embodiment, said method comprises:

a mobile core network entity capable of serving a User Equipment, such as Mobility Management Entity MME, storing configuration information including a mapping of mobile network areas to administrative areas, each being associated with an administrative area level identifier.

In an embodiment, said method comprises:

a mobile core network entity capable of serving a User Equipment, such as Mobility Management Entity MME, detecting a user change of administrative area, based on configuration information including a mapping of mobile network areas to administrative areas, and on mobility related signaling.

In an embodiment, said method comprises:

a mobile core network entity capable of serving a User Equipment UE, such as Mobility Management Entity MME, triggering towards a RAN entity such as eNB, a reporting of user change of cell, in case the UE is located in a mobility management area such as TA containing cells that are split into multiple administrative areas.

In an embodiment, said method comprises:

a mobile core network entity capable of serving a User Equipment UE, such as Mobility Management Entity MME, detecting a user change of administrative area, based on a reporting of cell change from a RAN entity such as eNB, in case the UE is located in a mobility management area such as TA containing cells that are split into multiple administrative areas.

In an embodiment, said method comprises:

a mobile core network entity capable of serving a User Equipment UE, such as Trusted WLAN Access Gateway TWAG, detecting the current administrative area where the UE is located based on Radius signaling coming from WLAN access Network (Access Point/Access Controller) currently serving the UE In another aspect, there is provided a method for enhancing the reporting, respectively triggering the reporting of, user location change in a mobile network.

Various embodiments are provided, which may be taken alone or in combination, according to various combinations, including following embodiments.

In an embodiment, said method comprises:

reporting, respectively triggering the reporting of, user location change of administrative area at at least one administrative level, wherein an administrative level is associated in said mobile network with a mapping of administrative areas onto mobile network related areas defined for mobile network management.

In an embodiment, said method comprises:

a Policy and Charging Rules Function PCRF/Online Charging System OCS sending to a Packet Data Network Gateway PDN GW a request to start/stop said reporting.

In an embodiment, said method comprises:

said PCRF/OCS sending said request in an Event-Trigger AVP associated with an administrative level identifier.

In an embodiment, said method comprises:

a Packet Data Network Gateway PDN GW reporting said user location change to a Policy and Charging Rules Function PCRF/Online Charging System OCS.

In an embodiment, said method comprises:

said PDN GW sending said report in an Event-Report-Indication AVP associated with an administrative level identifier.

In an embodiment, said method comprises:

a Packet Data Network Gateway PDN GW sending towards a Mobility Management Entity MME/Serving GPRS Support Node SGSN/Trusted WLAN Access Gateway TWAG, a request to start/stop said reporting.

In an embodiment, said method comprises:

said PDN GW sending said request in an Action value, associated with an administrative level identifier, of a Change Reporting Action Information Element.

In an embodiment, said method comprises:

a Mobility Management Entity MME/Serving GPRS Support Node SGSN//Trusted WLAN Access Gateway TWAG, sending towards a Packet Data Network Gateway PDN GW a report of said user location change.

In an embodiment, said method comprises:

said MME/SGSN/TWAG sending said report in a User Location Information ULI Information Element associated with an administrative level identifier.

In an embodiment, said method comprises:

an Operation And Maintenance OAM entity configuring a mobile core network entity capable of serving a User Equipment, such as Mobility Management Entity MME, with a mapping of mobile network areas including mobility management areas such as Tracking Area TA, to administrative areas, each being associated with an administrative area level identifier, or to an indication that a mobility management area is split between multiple administrative areas.

In an embodiment, said method comprises:

a eNodeB eNB sending to at least one Mobility Management Entity MME, respectively a Mobility Management MME receiving from a eNodeB eNB, configuration information including a mapping of said eNB and/or of at least one cell supported by said eNB, to an administrative area at an administrative level.

In an embodiment, said method comprises:

said eNB sending, respectively said MME receiving, said configuration information in S1 signaling, such as in Setup Request message, or eNB Configuration Update message.

In an embodiment, said method comprises:

said eNB sending said configuration information to the MMEs of a MME Pool Area.

In an embodiment, said method comprises:

said MME storing the received configuration information.

In an embodiment, said method comprises:

an Operation And Maintenance OAM entity configuring a mobile core network entity capable of serving a User Equipment, such as Mobility Management Entity MME or Serving GPRS Support Node SGSN, with a mapping of mobile network areas including areas served by one or more cells or service areas such as eNodeB eNB, to administrative areas, each being associated with an administrative area level identifier.

In other aspects, there are provided entities for performing related step(s) of such method(s), said entities including, in particular (though not exclusively): RAN entity such as eNB in EPS network, mobile core network entity capable of serving a User Equipment such as Mobility Management Entity MME or Serving GPRS Support Node SGSN or Trusted WLAN Access Gateway TWAG in EPS network, policy and/or charging controller such as Policy and Charging Rules Function PCRF or Online Charging System OCS in EPS network, mobile network entity such as Packet Data Network Gateway PDN GW in EPS network, Operation And Maintenance OAM entity.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method, comprising:
sending a request to report whether a user equipment has changed of area referred to as an administrative area at an area level in a mobile network referred to as administrative area level, wherein the administrative area level comprises a set of administrative areas, wherein an administrative area comprises a set of mobile network related areas defined for mobile network management; and
receiving a report whether said user equipment has changed of administrative area;
wherein said request to report a change of administrative area is triggered from a policy and/or charging controller.

2. The method according to claim 1, wherein:
the request to report whether said user equipment has changed administrative area contains an administrative area level identifier.

3. The method according to claim 1, wherein:
the report whether said user equipment has changed administrative area contains an administrative area level identifier.

4. The method according to claim 1, wherein said set of mobile network related areas comprises a set of tracking areas and/or radio access network entities and/or cells.

5. The method according to claim 1, wherein configuration information, including a mapping of mobile network related areas to administrative areas, associated with an administrative area level identifier, is stored in a mobility management entity.

6. An apparatus, comprising:
at least one processor; and
at least one memory including computer program code;
the at least one memory and the computer program code configured to, with the at least one processor, cause the apparatus at least to perform:
send a request to report whether a user equipment has changed of area referred to as administrative area at an area level in a mobile network referred to as administrative area level, wherein the administrative area level comprises a set of administrative areas, wherein an administrative area comprises a set of mobile network related areas defined for mobile network management; and
receive a report whether said user equipment has changed administrative area;
wherein said request to report a change of administrative area is triggered from a policy and/or charging controller.

7. The apparatus according to claim 6, wherein:
the request to report whether said user equipment has changed administrative area contains an administrative area level identifier.

8. The apparatus according to claim 6, wherein:
the report whether said user equipment has changed administrative area contains an administrative area level identifier.

9. An apparatus, comprising:
at least one processor; and
at least one memory including computer program code;
the at least one memory and the computer program code configured to, with the at least one processor, cause the apparatus at least to perform:
receive a request to report whether a user equipment has changed of area referred to as administrative area at an area level in a mobile network referred to as administrative area level, wherein the administrative area level comprises a set of administrative areas, wherein an administrative area comprises a set of mobile network related areas defined for mobile network management; and send a report whether said user equipment has changed administrative area;

wherein said request to report a change of administrative area is triggered from a policy and/or charging controller.

10. The apparatus according to claim 9, wherein:
the request to report whether said user equipment has changed administrative area, and the report, contains an administrative area level identifier.

11. The apparatus according to claim 9, wherein:
the report whether said user equipment has changed administrative area contains an administrative area level identifier.

12. A method, comprising:
receiving a request to report whether a user equipment has changed of area referred to as administrative area at an area level in a mobile network referred to as administrative area level, wherein the administrative area level comprises a set of administrative areas, wherein an administrative area comprises a set of mobile network related areas defined for mobile network management; and sending a report whether said user equipment has changed administrative area;

wherein said request to report a change of administrative area is triggered from a policy and/or charging controller.

13. The method according to claim 12, wherein:
the request to report whether said user equipment has changed administrative area contains an administrative area level identifier.

14. The method according to claim 12, wherein:
the report whether said user equipment has changed administrative area contains an administrative area level identifier.

15. The method according to claim 12, wherein said set of mobile network related areas comprises a set of tracking areas and/or radio access network entities and/or cells.

16. The method according to claim 12, wherein configuration information, including a mapping of mobile network related areas to administrative areas, associated with an administrative area level identifier, is stored in a mobility management entity.

* * * * *